July 1, 1941.
C. D. PETERSON ET AL
2,247,715
BALKING RING CLUTCH
Filed Dec. 21, 1939
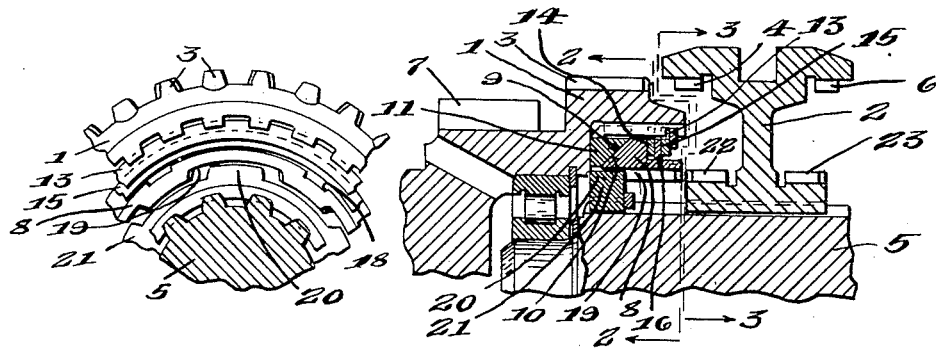
Fig. 2. Fig. 1.
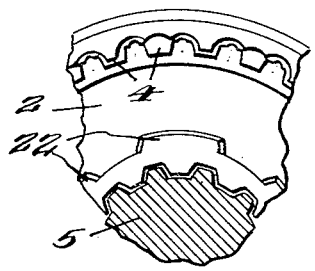
Fig. 3.
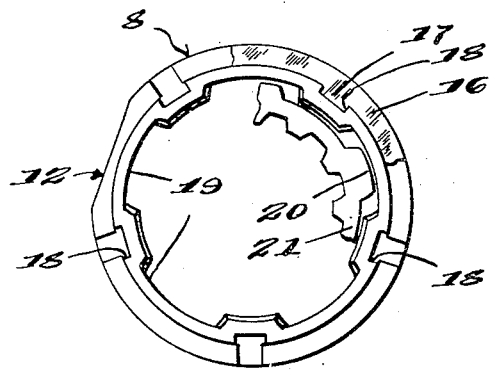
Fig. 4.
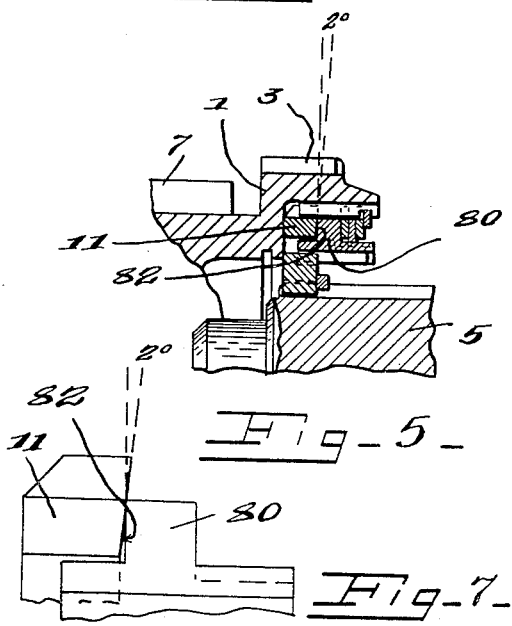
Fig. 5.
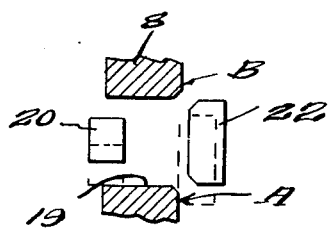
Fig. 6.
Fig. 7.
INVENTORS,
Carl D. Peterson + Albert H. Weimel
BY
Bodell + Thompson
ATTORNEYS.

Patented July 1, 1941

2,247,715

UNITED STATES PATENT OFFICE 2,247,715

BALKING RING CLUTCH

Carl D. Peterson and Albert H. Deimel, Toledo, Ohio

Application December 21, 1939, Serial No. 310,302

5 Claims. (Cl. 192—53)

This invention relates to balking ring type of clutches, tnat is, clutches embodying a balking ring which prevents engagement of toothed clutch faces or balks or blocks out engagement of the toothed clutch faces, until the speeds of the driving and driven members to be coupled by the clutch, cross and which, upon the crossing of the speeds, rocks the balking ring out of blocking-out position.

It has for its object a balking ring effecting the same result as the balking ring of our pending application, Serial No. 270,182, filed April 26, 1939, but of slightly different construction, and of the same construction as the balking ring clutch shown in our pending application, Serial No. 281,014, filed June 24, 1939, of which this application is a continuation in part.

It has for its particular object a clutch in which the balking ring is provided with or built with means self-contained therewith for causing the balking ring to frictionally engage with a controlled or predetermined dragging friction sufficient at all speeds to overcome the inertia of the balking ring and cause it to be controlled by the dragging friction through the member with which it frictionally engages, and hence have a delicate and accurate operation and avoid violent shifting and overthrow of the balking ring.

More specifically, it has for its object a balking ring which initially engages its friction face with the friction face of the member with which it coacts by a slight radial shift of the balking ring rather than by springs acting on the balking ring, and more specifically, a balking ring that has a weighted portion on one side of its axis in a radial direction, so that this weighted side engages with a greater radial force under centrifugal action than the side diametrically opposite the weighted portion, or, in other words, a balking ring that is eccentrically weighted.

The speeds cross when the driving member rotating faster than the driven member decelerates to the slower speed of the driven member or when the driven member accelerates to the speed of the driving member, or when the driving member is rotating slower than the driven member at the time the clutch is to be shifted in, and is accelerated up to the speed of the driven member or the driven member allowed to decelerate to the speed of the driving member. Under such conditions, the balking ring, which is rocked and held in operative, blocking or balking position by the different speeds, is rocked by the dragging friction into unblocking position at the instant the speeds cross, and thus permits the shifting of the toothed clutch faces into engagement.

The invention consists in the novel features and in the combinations and constructions hereinafter set forth and claimed.

In describing this invention, reference is had to the accompanying drawing in which like characters designate corresponding parts in all the views.

Figure 1 is a fragmentary sectional view through a clutch embodying this invention.

Figures 2 and 3 are fragmentary sectional views taken on lines 2—2 and 3—3, respectively, Figure 1.

Figure 4 is a detail view of the balking ring.

Figure 5 is a fragmentary view, similar to Figure 1, of a slightly different form of balking ring clutch with respect to the arrangement of the friction faces.

Figure 6 is a developed operation view of the balking ring clutch.

Figure 7 is a diagrammatic view illustrating the relative divergence of the radial friction faces of the balking ring in Figure 5 and the ring with which it coacts.

1 and 2 designate the toothed members of the clutch, one of these being the driving member and the other the driven member, and one of them being shiftable axially into and out of engagement with the other. In the illustrated embodiment of the invention, the member 1 is ordinarily the driving member, it being rotatable with the drive shaft or crank shaft of the engine of the vehicle through the usual engine clutch or through the runner of a hydraulic coupling or hydraulic fly wheel. Under some conditions, the driven member may become temporarily the driving member, as when the vehicle is coasting. It is immaterial which of the members 1, 2 is the driver and which is the driven, or which is shiftable.

The driving clutch member 1 and the driven clutch member 2 are formed with teeth or jaws 3, 4 operable into interlocking or clutching engagement by the axial shifting of one of the clutch members, here shown as the clutch member 2. The clutch member 2 is splined on and shiftable axially of the output or driven shaft 5 of the transmission mechanism, in which the clutch is installed, and preferably is shiftable in opposite directions from neutral to effect direct drive and indirect drive through gears on a counter shaft. The clutch member 2 being of double construction is provided on one side thereof with the teeth 4 and on the opposite side with a similar set of teeth 6. The output shaft is alined with an input shaft, both being suitably mounted in a gear box and the indirect drives are effected through gears on the usual counter shaft, the drive shaft being provided with a gear 7 meshing with a gear on the counter shaft to rotate the counter shaft, all as is well understood.

8 designates the balking ring having a friction face 9 at an angle to its axis of rotation, it being shown in Figure 1 as conical, coacting with a complemental face 10 provided on the driving member 1 or on a ring 11 interlocking with the driving member 1 to rotate as a unit therewith. The friction face 9 of the balking ring 8 is engaged with light dragging friction with the complemental face 10 sufficient to overcome the inertia or momentum of the ring 8, when rotating at any speed, and in order to bring about the dragging friction, the balking ring is eccentrically weighted or so formed as to have a slight radial throw sufficient to bring the heavier side thereof against the ring 11 under the action of the centrifugal force which carries with the speed of rotation, and thus create a slight frictional drag of the balking ring 8, in order to rock the balking ring 8 relatively to the shaft 5 and the clutch member 2, within limits, into and out of locking or blocking position, the friction drag at all speeds being sufficient to overcome the inertia or momentum of the balking ring.

The balking ring 8 is here shown as eccentrically weighted by removing a side rear portion thereof, as shown at 12, Figure 4.

The balking ring 8 is held assembled with the clutch member 1 by a lock ring 13 and additional friction rings 14, 15 and 16 interposed between the lock ring and the balking ring. The rings 14 and 15 are interlocked with the clutch member 1 and rotate therewith and the ring 16 is interposed between the rings 14, 15 and interlocked with the balking ring 8, it being provided with internal lugs 17 extending into recesses 18 in the balking ring. The rings 14, 15 and 16 serve to initially thrust the balking ring into light frictional engagement with the ring 11 to cause it to drag on the ring 11, and hence to rock about the axis of the shaft 5 or have a partial rotary movement about the shaft 5 during the locking and unlocking movement of the balking ring until the centrifugal force is built up on the balking ring 8 and the dragging effect increased in accordance with the speed. One of these rings, as 16, may be in the nature of a spring or wave washer. The rings 14, 15, 16 are located in an annular recess in the balking ring 8.

The balking ring 8 is formed with internal transverse passages or recesses 19 which receive radial projections 20 on a ring 21 splined to the output shaft 5. The projections 20 are of less width than the passages or recesses 19 to permit a rotary movement, within limits, of the balking ring 8 relative to the ring 21.

The clutch section 2 is provided with radial projections 22 and 23 on opposite sides thereof. As before stated, the clutch is a double one shiftable in opposite directions from neutral position. The projections 22 or 23 are of the same width as the recesses or passages 19 and are free to pass through said recesses or passages, when alined therewith, in order to prevent shifting of the clutch section 2 to carry the clutch teeth 4 thereof into interlocking engagement with the clutch teeth 3 of the driving clutch section 1 but to block or balk such shifting when out of alinement therewith. The balking ring 8 is rocked to carry the passages or recesses 19 out of alinement with the teeth or projections 22, so that the teeth or projections 22 lap at A or B (Figure 6) on the balking ring 8, when the driving and driven clutch members 1, 2 are rotating at different speeds at the time the shift is being initiated. This is due to the drag of the balking ring 8 on the friction face 10 of the ring 11, due first to the friction rings 14, 15 and 16, and then to the eccentric weighting of the balking ring. When, however, the speeds cross, the same drag moves the recesses or passages 19 gradually or without jumping into alinement with the teeth 22, and hence with shifting pressure being applied, the teeth 22 may pass through the passages or recesses 19 and bring the clutch teeth 4 into interlocking engagement with the clutch teeth 3. When the shift is made to the right from neutral, the clutch teeth 6 are brought into engagement with complemental clutch teeth on the gear, not shown, on the output shaft 5 and a balking ring similar to the balking ring 8 controls the blocking and unblocking of the teeth 23.

In Figure 5, the balking ring 80 is shown with a different form of friction face from that shown in Figure 1. In Figure 5, the friction ring 11 on the driving member 1 and the coacting friction face on the balking ring 80 are shown as arranged at a small angle, that is, an angle of 2° relatively to each other, one of the faces, here shown as the radial face on the balking ring, being annular and flat and normal to the axis of rotation, while the coacting face 82 on the balking ring 11 diverges from the flat annular face on the friction ring 11 from the periphery toward the axis, it contacting with the ring 11 at its peripheral edge to insure contact between the radial friction faces at as large a mean radius as possible, as compared with a radius of the balking teeth 22, which are of less radius than that of the frictionally engaged faces on the friction ring 11 and the balking ring 80. When the balking ring is unlocking or subject to an unlocking force, there should be a slippage between the balking teeth 22 on the member 2 and the balking ring and no slip should occur between the balking ring 80 and the friction ring 11, or in other words, the friction between the balking ring 80 and the ring 11 should be greater than the friction between the teeth 22 and the balking ring, when the balking teeth are engaged, with the balking ring in the relative position indicated in Figure 6 with the teeth 22 in the dotted line position. As the surface of the ring 11 wears, this ring being of bronze, the contact surface will increase or spread over the surface of the ring 11, but the mean radius of contact will never be reduced to the inner radius of the friction face of the friction ring 11.

In this balking ring clutch, the balking ring is subjected to constant frictional force which overcomes the effect of the inertia of the ring at all speeds and keeps the ring at all times in correct relation to the locking shoulders or projections 22, and the means by which the overcoming is effected is embodied in the balking ring by providing the eccentrically weighted portion.

What we claim is:

1. In a balking ring clutch, the combination with driving and driven toothed clutch members, one of which is shiftable axially into and out of engagement with the other, a balking ring rotatable with one of said members and also rotatable relatively thereto, within limits, and having a friction face, the other member having a friction face for coacting with the friction face of the balking ring, the balking ring having an axial movement during the shifting of the shiftable clutch member and having a rotary movement, within limits, into and out of balking position; of said balking ring having a portion on one side thereof heavier than the diametrically opposite side, whereby the ring has a radial throw in one direction from its axis to cause the engagement of the friction faces with sufficient dragging friction to neutralize the inertia of the balking ring.

2. In a balking ring clutch, the combination with driving and driven toothed clutch members, one of which is shiftable axially into and out of engagement with the other, a balking ring rotatable with one of said members and also rotatable relatively thereto, within limits, and having a friction face, the other member having a friction face for coacting with the friction face of the balking ring, the balking ring having an axial movement during the shifting of the shiftable clutch member and having a rotary movement, within limits, into and out of balking position; of said balking ring being constructed to be heavier on one side than on the diametrically opposite side, whereby the ring has a radial throw in one direction from its axis to cause the engagement of the friction faces with sufficient dragging friction to neutralize the inertia of the balking ring.

3. In a balking ring, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of said balking ring being constructed to have a radial throw in one radial direction greater than the opposite radial direction, to engage the friction faces with sufficient dragging friction at all speeds to neutralize the inertia of the balking ring.

4. In a transmission mechanism, a transmission gearing including a balking ring clutch, the clutch including driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring being formed with transverse passages therethrough and a shiftable clutch member with which it rotates provided with projections for slidably fitting said passages and normally located out of the same and engageable with the balking ring on one side or the other of said passages when out of alinement therewith, the shiftable member having axial movement relatively to the balking ring when the projections are alined with the passages to engage the toothed clutch faces, the friction faces being arranged to frictionally engage under the centrifugal action of the balking ring and the balking ring being eccentrically weighted and having a slight radial displacement to cause its friction face to drag with light friction on the friction face coacting therewith.

5. In a balking ring, the combination with driving and driven toothed clutch members, one of which is shiftable axially into and out of engagement with the other, a balking ring rotatable with the shiftable member and also rotatable relatively thereto, within limits, and having a friction face, the other member having a friction face for coacting with the friction face of the balking ring, the balking ring and the shiftable member having relative axial movement during the shifting of the shiftable clutch member, the balking ring being formed with transverse passages therethrough and the shiftable clutch member with which it rotates provided with projections for slidably fitting said passages and normally located out of the same and engageable with the balking ring on one side or the other of said passages when out of alinement therewith; of said balking ring and the clutch member with which it coacts having friction faces extending in a general radial direction, one of said radial coacting friction faces diverging out of an exact radial plane from the periphery of the balking ring inwardly away from the other friction face, whereby the radial friction faces coact near the periphery of the balking ring at a greater radius from the axis of rotation than said projections, and said projections being located nearer the axis of rotation than said radial friction faces.

CARL D. PETERSON.
ALBERT H. DEIMEL.